United States Patent [19]

Cooper et al.

[11] Patent Number: 4,963,945

[45] Date of Patent: Oct. 16, 1990

[54] BAND REJECTION FILTERING ARRANGEMENT

[75] Inventors: David M. Cooper, Wayne; Gerald Lebleboojian, West Caldwell, both of N.J.

[73] Assignee: Plessey Electronic Systems Corp., Wayne, N.J.

[21] Appl. No.: 334,431

[22] Filed: Apr. 7, 1989

[51] Int. Cl.[5] .......... H04B 1/44

[52] U.S. Cl. .......... 455/307; 455/83; 333/109

[58] Field of Search .......... 455/78, 80, 81, 83, 455/103, 119, 305, 306, 307; 333/109, 110, 115, 116

[56] References Cited

U.S. PATENT DOCUMENTS 2,561,212 7/1951 Lewis .......... 250/15
3,058,070 10/1962 Reingold et al. .......... 333/109
4,087,751 5/1978 Kato et al. .......... 325/24
4,583,061 4/1986 OShea .......... 333/109

FOREIGN PATENT DOCUMENTS 2100080 12/1982 United Kingdom .

*Primary Examiner*—Reinhard J. Eisenzopf
*Assistant Examiner*—Edward Urban
*Attorney, Agent, or Firm*—David L. Davis

[57] ABSTRACT

A band rejection filtering arrangement utilizing bandpass filters each terminated by a matched load. A quadrature hybrid circuit divides the input signals and applies them to the bandpass filters. Signals within the rejection band are dissipated by the filters and matched loads, whereas desired signals are reflected. The reflected signals are then combined by the quadrature hybrid circuit to provide the band rejected output. This arrangement is made switchable between an all pass mode and the band rejection mode by providing PIN diodes between the quadrature hybrid circuit and the bandpass filters.

10 Claims, 2 Drawing Sheets

BAND REJECTION FILTERING ARRANGEMENT

BACKGROUND OF THE INVENTION

This invention relates to filters and, more particularly, to an improved band rejection filter.

Band rejection, or notch, filters are in general more difficult and costly to implement than bandpass filters, which, for certain applications, have much less stringent requirements. It is therefore an object of the present invention to provide an arrangement which operates as a band rejection filter but utilizes a bandpass filter.

Certain communications systems operate in a first mode wherein all frequencies are passed and in a second mode wherein one or more frequency bands are rejected. It is therefore another object of this invention to provide an arrangement utilizing a bandpass filter in place of a notch filter which is selectively switchable to allow more than one mode of operation.

SUMMARY OF THE INVENTION

The foregoing, and additional, objects are attained in accordance with the principles of this invention by providing a band rejection filtering arrangement which comprises a quadrature hybrid circuit having a first pair of terminals and a second pair of terminals, a first bandpass filter having its input coupled to one of the second pair of terminals of the quadrature hybrid circuit, a first load coupled to the output of the first bandpass filter, a second bandpass filter having its input coupled to the other of the second pair of terminals of the quadrature hybrid circuit, a second load coupled to the output of the second bandpass filter, means for providing an input signal at a first of the first pair of terminals of the quadrature hybrid circuit, and means for receiving a signal at the other of the first pair of terminals of the quadrature hybrid circuit.

In accordance with an aspect of this invention, the first and second bandpass filters are tuned to pass the desired rejection band.

In accordance with a further aspect of this invention, the arrangement further includes switching means for selectively switching the arrangement between an all pass mode and a band rejection mode. The switching means comprises first controllable resistance means coupled to the first of the second pair of terminals of the quadrature hybrid circuit and the first bandpass filter input, second controllable resistance means coupled to the other of the second pair of terminals of the quadrature hybrid circuit and the second bandpass filter input, and control means coupled to the first and second controllable resistance means for selectively causing the first and second controllable resistance means to each exhibit either a low resistance characteristic or a high resistance characteristic in order to selectively achieve the all pass mode or the band rejection mode.

In accordance with yet another aspect of this invention, the first and second controllable resistance means each includes a PIN diode.

In accordance with still another aspect of this invention, the control means includes means for controlling the bias polarity of the PIN diodes.

BRIEF DESCRIPTION OF THE DRAWINGS

The foregoing will be more readily apparent upon reading the following description in conjunction with the drawings in which like elements in different figures thereof have the same reference numeral and wherein.

DETAILED DESCRIPTION

Figure 1:
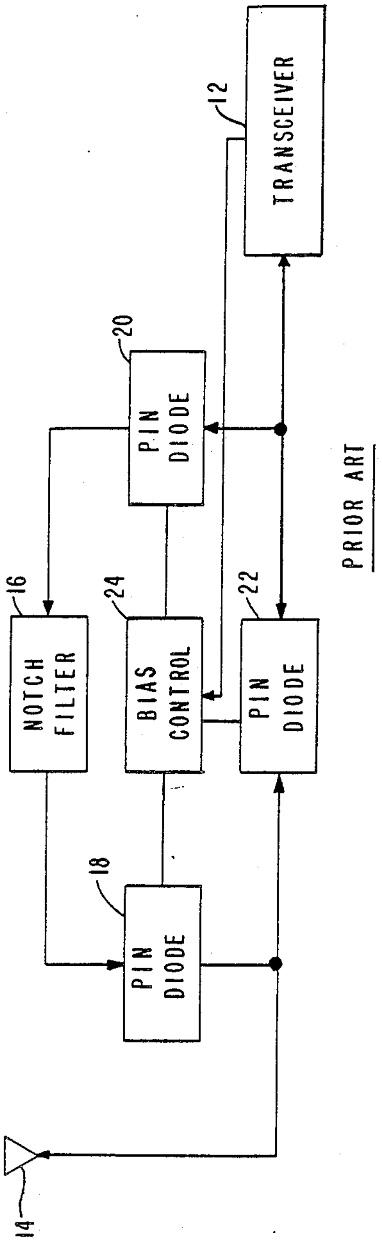
FIG. 1 is a block diagram of a prior art switchable band rejection filtering arrangement.

FIG. 1 illustrates a prior art approach to providing a switchable band rejection filtering arrangement between a transceiver 12 and an antenna 14. This arrangement uses a notch filter 16 and PIN diodes 18, 20 and 22 as a transfer switch. A PIN diode, illustratively of the type manufactured by Unitrode Corporation of Lexington, Mass., is a semiconductor device that operates as a variable resistor at radio frequencies and microwave frequencies. The resistance value of the PIN diode is determined only by its DC excitation. When a PIN diode is forward biased, it exhibits a low resistance characteristic. At high radio frequencies, when a PIN diode is at zero or reverse bias, it appears as a parallel plate capacitor with a parallel resistance which is proportional to reverse voltage and inversely proportional to frequency.

In the arrangement shown in FIG. 1, the PIN diodes 18, 20 and 22 are under the control of bias control circuit 24. The bias control circuit 24 is under the control of the transceiver 12. When it is desired to operate the system in an all pass mode, the transceiver 12 sends a signal to the bias control circuit 24 to cause it to forward bias the PIN diode 22 and to reverse bias the PIN diodes 18 and 20. Accordingly, the notch filter 16 is bypassed. Conversely, when it is desired to operate the system in a band rejection mode, the transceiver sends a signal to the bias control circuit 24 to cause it to reverse bias the PIN diode 22 and to forward bias the PIN diodes 18 and 20. This causes the notch filter 16 to be inserted in the transmission path between the transceiver 12 and the antenna 14. Two major disadvantages of this approach are that the full transmit power must pass through the notch filter 16 and the PIN diodes and that undesirably high insertion losses result.

Figure 2:
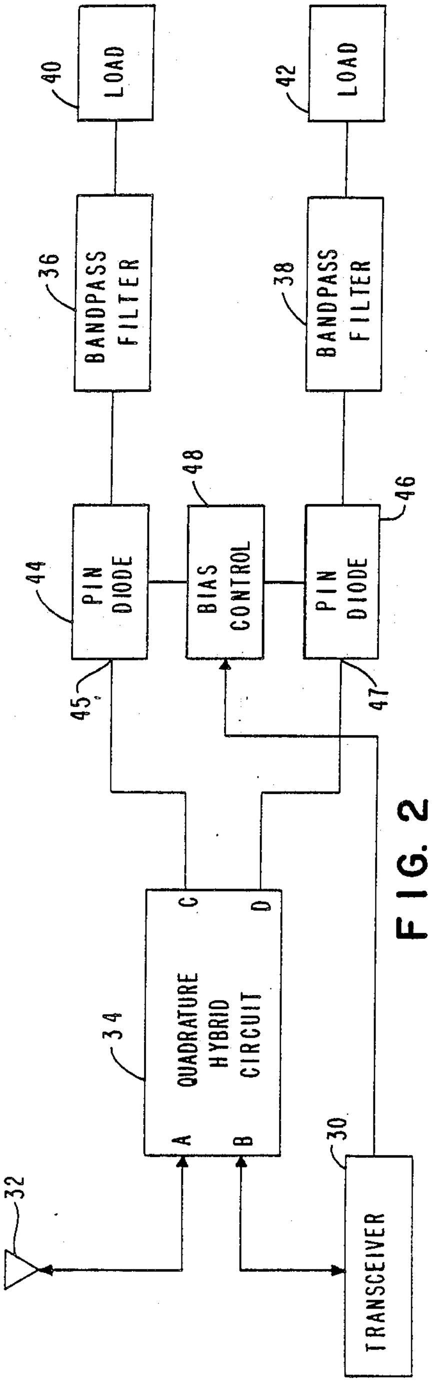
FIG. 2 is a block diagram of a first embodiment of a switchable band rejection filtering arrangement constructed in accordance with the principles of this invention.

FIG. 2 illustrates a first embodiment of a system constructed in accordance with the principles of this invention which is an improvement over the prior art system depicted in FIG. 1. In the system shown in FIG. 2, the transceiver 30 is coupled to the antenna 32 through the quadrature hybrid circuit 34. The quadrature hybrid circuit 34, illustratively of the type manufactured by Anzac Electronics of Waltham, Mass., is a low loss reciprocal four port device. The relationship between signals at the ports A, B, C and D is as follows. A signal appearing at the port A is transmitted to the port C with some amount of attenuation but no phase shift, and is transmitted to the port D with some amount of attenuation and a 90° phase shift. A signal appearing at the port B is transmitted to the port D with some amount of attenuation and no phase shift, and is transmitted to the port C with some amount of attenuation and a 90° phase shift. A signal appearing at the port C is transmitted to the port A with some attenuation and no phase shift, and is transmitted to the port B with some attenuation and a 90° phase shift. A signal appearing at the port D is transmitted to the port B with some amount of attenuation and no phase shift, and is transmitted to the port A with some amount of attenuation and a 90° phase shift. There is isolation between the ports A and B and there is isolation between the ports C and D.

The band rejection mode of operation is achieved in accordance with the principles of this invention by providing bandpass filters 36 and 38 terminated by matched loads 40 and 42, respectively, all tuned to the desired rejection band. Signals within the rejection band are then absorbed by the bandpass filters 36, 38 and the loads 40, 42, whereas signals outside the rejection band are reflected by the out-of-band mismatch characteristics of the bandpass filters 36, 38.

Switching between the all pass mode and the band rejection mode is accomplished by the PIN diodes 44 and 46, which are under the control of the bias control circuit 48, which in turn responds to signals from the transceiver 30.

Typically, in the receive mode of operation, the arrangement shown in FIG. 2 is operated as an all pass network. In this mode of operation, the transceiver 30 provides a signal to the bias control circuit 48 to cause it to reverse bias the PIN diodes 44 and 46 so that they act as high impedance devices. Accordingly, the signal received by the antenna 32 enters the port A of the quadrature hybrid circuit 34 where it is divided by the quadrature hybrid circuit 34 to the ports C and D. Due to the high impedance mismatch of the PIN diodes 44 and 46, the divided signals are reflected back to the ports C and D of the quadrature hybrid circuit 34, in which they are subsequently recombined at the port B and sent to the transceiver 30.

In the transmit all pass mode, like in the aforedescribed receive mode, the PIN diodes 44 and 46 are reverse biased. Accordingly, the signal from the transceiver 30 which is applied to the port B of the quadrature hybrid circuit 34 is divided to the ports C and D. The divided signals are then reflected by the PIN diodes 44 and 46 back to the ports C and D, so that they are recombined at the port A of the quadrature hybrid circuit 34 for subsequent radiation from the antenna 32.

In the transmit band rejection mode of operation, the PIN diodes 44 and 46 are forward biased so that they exhibit a low impedance characteristic. The transmit signal from the transceiver 30 is applied to the port B of the quadrature hybrid circuit 34, which then divides the signal and applies it to the ports C and D. Since the PIN diodes 44 and 46 are forward biased to exhibit a low impedance characteristic, the signals at the ports C and D are applied to the bandpass filters 36 and 38, respectively. The in-band characteristic of the bandpass filters 36, 38 allows the in-band portions of the signals to be passed therethrough to the loads 40, 42, where they are dissipated. The out-of-band characteristic of the bandpass filters 36, 38 causes reflection of the remaining portions (that which is wanted) of the transmit energy back to the ports C and D. The wanted signals are then recombined at the port A for application to the antenna 32. It can be demonstrated that the ratio of output power to input power at ports A and B is equal to one-fourth of the square of the sum of the reflection coefficients at the points 45 and 47. If these reflection coefficients are equal then the power ratio equals the square of the reflection coefficient.

The major advantage of the arrangement shown in FIG. 2 over that shown in FIG. 1 is that the PIN diodes and the bandpass filters do not have to pass the full power of the transmitted energy. Therefore, lower power PIN diodes may be used, which results in lower insertion losses. Also, the use of lower power PIN diodes greatly reduces the generation of harmonics associated with high power PIN diodes. Additionally, bandpass filters can be designed and built at lower cost and with less stringent requirements than notch filters.

Figure 3:
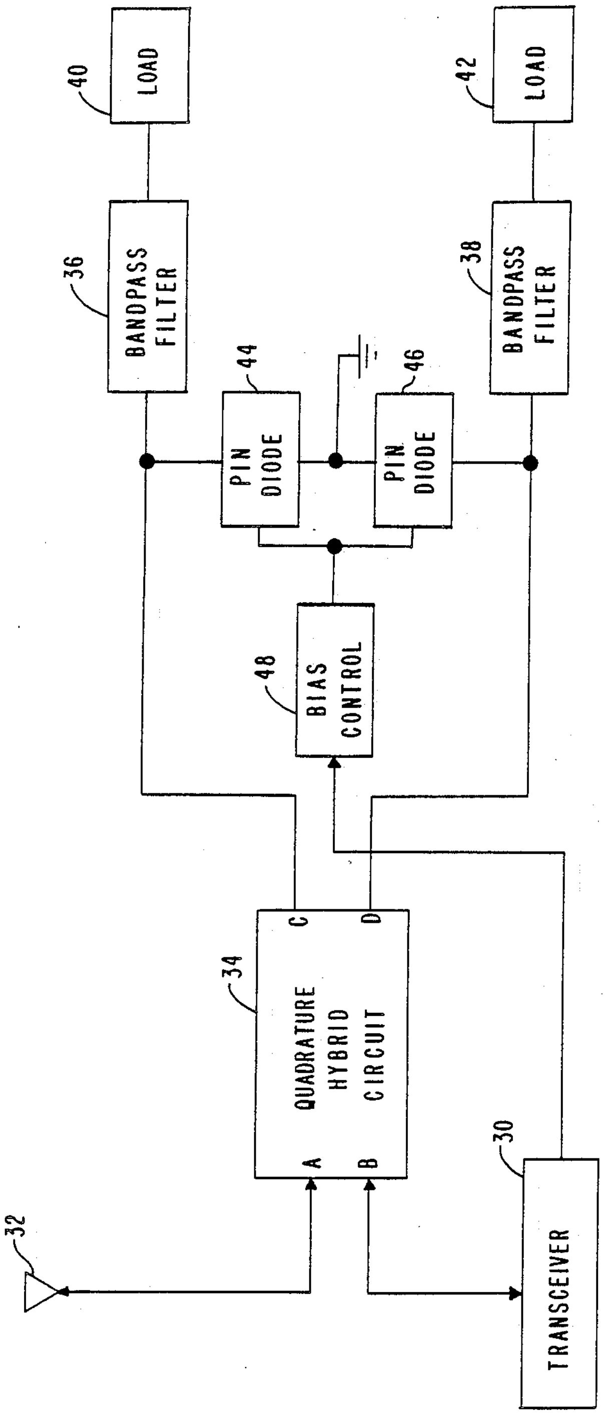
FIG. 3 is a block diagram of a second embodiment of a switchable band rejection filtering arrangement constructed in accordance with the principles of this invention.

An alternate embodiment to the arrangement shown in FIG. 2 is illustrated in FIG. 3. In this alternate embodiment, the PIN diodes 44 and 46 are arranged in a shunt, instead of a series, configuration. In the embodiment illustrated in FIG. 3, to achieve an all pass mode of operation, the PIN diodes 44 and 46 are forward biased so that they are shorted to ground. The band rejection mode is attained by reverse biasing the PIN diodes 44 and 46 so they exhibit high impedance characteristics.

Accordingly, there have been disclosed switchable band rejection filtering arrangements. It is understood that the above-described embodiments are merely illustrative of the application of the principles of this invention. Numerous other arrangements may be devised by those skilled in the art without departing from the spirit and scope of this invention, as defined by the appended claims.

We claim:

1. A band rejection filtering arrangement comprising:
- a quadrature hybrid circuit having a first pair of terminals and a second pair of terminals, said first pair of terminals being isolated from each other, said second pair of terminals being isolated from each other, signal transmissions between the first of said first pair of terminals and the first of said second pair of terminals being effected without phase shift, signal transmission between the first of said first pair of terminals and the second of said second pair of terminals being effected with a 90° phase shift, signal transmission between the second of said first pair of terminals and the second of said second pair of terminals being effected without phase shift, and signal transmission between the second of said first pair of terminals and the first of said second pair of terminals being effected with a 90° phase shift;
- a first bandpass filter having its input coupled to the first of said second pair of terminals;
- a second bandpass filter having its input coupled to the second of said second pair of terminals;
- a first load coupled to the output of said first bandpass filter;
- a second load coupled to the output of said second bandpass filter;
- means for providing an input signal at the first of said first pair of terminals; and
- means for receiving a signal at the second of said first pair of terminals;
- wherein said first and second bandpass filters are tuned to pass the rejection band.

2. The arrangement according to claim 1 wherein said first and second loads are matched to their respective bandpass filters.

3. The arrangement according to claim 1 wherein one of said providing means and said receiving means is a transceiver and the other of said providing means and said receiving means is an antenna.

4. The arrangement according to claim 1 further including switching means for selectively switching said arrangement between an all pass mode and a band rejection mode, said switching means comprising:

first controllable resistance means coupled to the first of said second pair of terminals and said first bandpass filter input;

second controllable resistance means coupled to the second of said second pair of terminals and said second bandpass filter input; and control means coupled to said first and second controllable resistance means for selectively causing said first and second controllable resistance means to each exhibit either a low resistance characteristic or a high resistance characteristic in order to selectively achieve said all pass mode or said band rejection mode.

5. The arrangement according to claim 4 wherein said first and second controllable resistance means each includes a PIN diode.

6. The arrangement according to claim 5 wherein said control means includes means for controlling the bias polarity of said PIN diodes.

7. The arrangement according to claim 6 wherein each of said PIN diodes is connected in series between a respective one of said second pair of terminals and a bandpass filter input.

8. The arrangement according to claim 7 wherein said control means is operative to forward bias said PIN diodes for said band rejection mode and is operative to reverse bias said PIN diodes for said all pass modes.

9. The arrangement according to claim 6 wherein each of said PIN diodes is connected as a shunt to ground from a respective bandpass filter input.

10. The arrangement according to claim 9 wherein said control means is operative to reverse bias said PIN diodes for said band rejection mode and is operative to forward bias said PIN diodes for said all pass mode.

* * * * *